US010997954B2

(12) United States Patent
Holmes et al.

(10) Patent No.: US 10,997,954 B2
(45) Date of Patent: May 4, 2021

(54) FOVEATED RENDERING USING VARIABLE FRAMERATES

(71) Applicant: QUALCOMM Incorporated, San Diego, CA (US)

(72) Inventors: Samuel Benjamin Holmes, Sterling, MA (US); Jonathan Wicks, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/520,711

(22) Filed: Jul. 24, 2019

(65) Prior Publication Data

US 2021/0027752 A1 Jan. 28, 2021

(51) Int. Cl.
| | |
|---|---|
| *G09G 5/397* | (2006.01) |
| *G09G 5/00* | (2006.01) |
| *G02B 27/00* | (2006.01) |
| *G06T 3/00* | (2006.01) |
| *G06T 7/73* | (2017.01) |

(52) U.S. Cl.
CPC ......... *G09G 5/397* (2013.01); *G02B 27/0093* (2013.01); *G06T 3/0093* (2013.01); *G06T 7/73* (2017.01); *G09G 5/001* (2013.01); *G09G 2340/0435* (2013.01); *G09G 2360/18* (2013.01)

(58) Field of Classification Search
CPC ................. G09G 5/397; G09G 5/001; G09G 2340/0435; G09G 2360/18; G06T 7/73; G06T 3/0093; G02B 27/0093
See application file for complete search history.

(56) References Cited

U.S. PATENT DOCUMENTS

| | | | | |
|---|---|---|---|---|
| 2017/0316601 A1* | 11/2017 | Kakarlapudi | ........... | G06T 17/05 |
| 2018/0081429 A1* | 3/2018 | Akenine-Moller | ..... | G06F 3/012 |
| 2018/0288423 A1* | 10/2018 | Vembar | ................ | H04N 19/167 |
| 2018/0357809 A1* | 12/2018 | Lawless | .................... | G06T 1/20 |
| 2020/0143516 A1* | 5/2020 | Martin | .................. | G06T 3/4092 |
| 2020/0258482 A1* | 8/2020 | Morein | .................. | G09G 5/391 |

FOREIGN PATENT DOCUMENTS

WO 2018222271 A1 12/2018

OTHER PUBLICATIONS

International Search Report and Written Opinion—PCT/US2020/042965—ISA/EPO—dated Oct. 30, 2020.

* cited by examiner

*Primary Examiner* — Maurice L. McDowell, Jr.
*Assistant Examiner* — Donna J. Ricks
(74) *Attorney, Agent, or Firm* — Qualcomm Incorporated

(57) ABSTRACT

Example techniques are described for generating graphics content by obtaining a rendering command for a first frame of the graphics content, rendering a full frame based on the rendering command for the first frame, storing the full frame in a buffer, obtaining a rendering command for a second frame of the graphics content, obtaining an eye position of a user, rendering a partial frame based on the rendering command for the second frame and the eye position of the user, obtaining the full frame from the buffer, and outputting the second frame, wherein the second frame is based on the full frame and the partial frame.

21 Claims, 8 Drawing Sheets

FOVEATED RENDERING USING VARIABLE FRAMERATES

BACKGROUND

An electronic device may execute a program to present graphics content on a display. For example, an electronic device may execute a virtual reality (VR) program or an augmented reality (AR) program.

In some applications, graphics presented at a display may be rendered at different resolutions in the same frame. For example, a VR headset may track a gaze of a user (e.g., using a sensor) to identify a graphics portion that will be in the user's foveal vision. If the VR headset determines that eye movement of the user follows a particular object presented at a display or indicates the user's foveal vision covers one or more regions, the electronic device may render corresponding region(s) (e.g., of the object) at a higher resolution and render other regions at lower resolution(s).

SUMMARY

Methods, devices, apparatus, and computer-readable media for generating graphics content are described herein.

The devices can include a memory; and a processor coupled to the memory configured to cause the device to: obtain a rendering command for a first frame of the graphics content; render a full frame based on the rendering command for the first frame; store the full frame in a buffer; obtain a rendering command for a second frame of the graphics content; obtain an eye position of a user; render a partial frame based on the rendering command for the second frame and the eye position of the user; obtain the full frame from the buffer; and output the second frame, wherein the second frame is based on the full frame and the partial frame.

In some embodiments, the processor is further configured to: warp the full frame based on pose data determined after rendering the full frame; and output the first frame after the full frame is warped and prior to outputting the second frame.

In some embodiments, the processor is further configured to: output the first frame, wherein the first frame comprises the full frame.

In some embodiments, processor is further configured to: store the partial frame in a second buffer that is different than the buffer; and obtain the partial frame from the second buffer prior to outputting the second frame.

In some embodiments, storing the full frame in the buffer comprises replacing data in the buffer corresponding to a previous full frame; and wherein storing the partial frame in the second buffer comprises replacing data in the second buffer corresponding to a previous partial frame.

In some embodiments, the buffer is larger than the second buffer.

In some embodiments, the partial frame corresponds to a region in the graphics content that is determined based on the eye position of the user.

In some embodiments, the processor is further configured to: combine the full frame and the partial frame using a warping algorithm to generate the second frame, wherein the full frame and the partial frame are warped based on pose data that is received after the full frame is rendered.

In some embodiments, the processor is further configured to: combine the full frame and the partial frame using a warping algorithm to generate the second frame, wherein the full frame and the partial frame are warped based on pose data that is received after the partial frame is rendered and the full frame is warped differently than the partial frame.

In some embodiments, the processor is further configured to: combine the full frame and the partial frame using a blending algorithm to generate the second frame, wherein blending is performed at boundaries of the full frame and the partial frame.

In some embodiments, the processor is further configured to: store the partial frame in a second buffer; obtain a rendering command for a third frame of the graphics content; obtain a second eye position of the user; render a second partial frame based on the rendering command for the third frame and the second eye position of the user; obtain the full frame from the buffer; obtain the partial frame from the second buffer; and output the third frame, wherein the third frame is based on the full frame, the partial frame, and the second partial frame.

In some embodiments, the device can comprise a display, wherein outputting the second frame comprises outputting to the display.

In some embodiments, the device is one or more of a wireless communication device, an augmented reality headset, or a virtual reality headset.

The methods can include generating graphics content by: obtaining a rendering command for a first frame of the graphics content; rendering a full frame based on the rendering command for the first frame; storing the full frame in a buffer; obtaining a rendering command for a second frame of the graphics content; obtaining an eye position of a user; rendering a partial frame based on the rendering command for the second frame and the eye position of the user; obtaining the full frame from the buffer; and outputting the second frame, wherein the second frame is based on the full frame and the partial frame.

The computer readable media can be non-transitory computer-readable media storing programs containing instructions that, when executed by a processor of a device, cause the device to perform a method comprising: obtaining a rendering command for a first frame of the graphics content; rendering a full frame based on the rendering command for the first frame; storing the full frame in a buffer; obtaining a rendering command for a second frame of the graphics content; obtaining an eye position of a user; rendering a partial frame based on the rendering command for the second frame and the eye position of the user; obtaining the full frame from the buffer; and outputting the second frame, wherein the second frame is based on the full frame and the partial frame.

The apparatus can include: means for obtaining a rendering command for a first frame of the graphics content; means for rendering a full frame based on the rendering command for the first frame; means for storing the full frame in a buffer; means for obtaining a rendering command for a second frame of the graphics content; means for obtaining an eye position of a user; means for rendering a partial frame based on the rendering command for the second frame and the eye position of the user; means for obtaining the full frame from the buffer; and means for outputting the second frame, wherein the second frame is based on the full frame and the partial frame.

DETAILED DESCRIPTION

Figure 1:
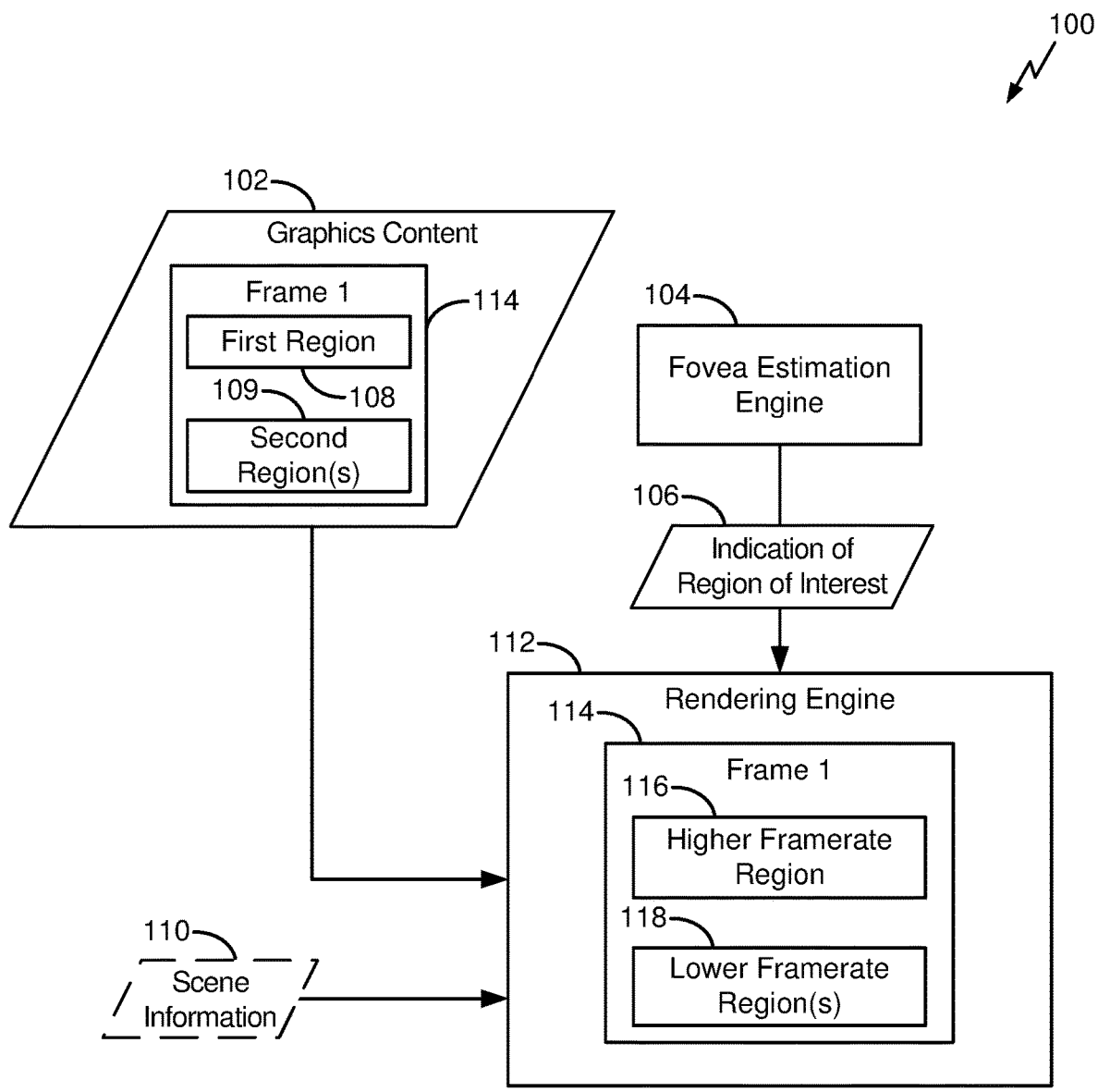
FIG. 1 is an example diagram of a device that can perform foveated rendering, consistent with disclosed embodiments.

The systems, devices, computer-readable media, and methods disclosed herein may provide approaches for rendering regions of frames of computer graphics content differently based on a position of one or more eyes of a user relative to a coordinate system and/or a device (hereinafter, an "eye position"). For example, one or more higher resolution regions and one or more lower resolutions regions may be rendered in the same image/frame. As used herein, a higher resolution may be any region that is greater than a lower resolution region. In various embodiments, a higher resolution can be, for example, 1400×1200 pixels, 1080× 1200 pixels, etc. and lower resolutions can be, for example, one half, one quarter, one eighth, one sixteenth, etc. of the higher resolution. These resolutions are merely examples and are not intended to be limiting. In some embodiments, a higher resolution can represent a full resolution of a display device and lower resolutions can be fractional resolutions of the full resolution. In other embodiments, a higher resolution can be greater or less than a full resolution of a particular display device and the higher resolution may be downsampled or upscaled before being displayed on the particular display device.

As another example, different regions of frames of computer graphics content can be rendered at different framerates. For example, one or more higher framerate regions and one or more lower framerate regions may be rendered across multiple images/frames. As used herein, a higher framerate may be any framerate that is greater than a lower framerate. In various embodiments, a higher framerate can be, for example, 30 frames per second (FPS), 60 FPS, 120 FPS, and the like, and lower frame rates can be, for example, one half, one third, one quarter, one eighth, one sixteenth, etc. of the higher framerate. These framerates are merely examples and are not intended to be limiting. In some embodiments, a higher framerate can represent a full framerate of a display device or application using the display device and lower framerates can be fractional framerates of the full framerate. In other embodiments, a higher framerate can be less than a full framerate of a particular display device or application using the display device.

In further embodiments, variable resolutions can be used in combination with variable framerates, as well as with other rendering parameters that can be different across regions of the same frame, such as antialiasing (AA) levels, blurring levels, filters used, levels of geometric detail, texture mipmap levels, and the like.

As used herein, a "region" of the graphics content can refer to a regular grid in optical space corresponding to a subset of a frame of the graphics content. In some embodiments, the regions can be the same for each frame of the graphics content. For example, each frame of the graphics content can be segmented into the same 64 regions. In other embodiments, the number and shapes of the regions can vary from frame to frame in the graphics content.

Rendering inefficiency may be one current technical problem in computer graphics rendering. For example, generating graphics content using a VR program, application, and/or device may include rendering two views of graphics content, which may make content twice as slow to render (potentially causing some latency, limiting available bandwidth on hardware component buses, affecting the displayed frame rate, affecting the motion-to-photon latency, etc.) and/or cause a device to utilize more power. One approach to solve the technical problem may be to render a region of the graphics content using parameters that utilize more processing resources (e.g., at a higher resolution and/or a higher framerate) and render the other region(s) of the scene using parameters that utilize fewer processing resources (e.g., at one or more lower resolutions and/or lower framerates).

For example, in some instances, the user may be primarily focused on the center of the graphics content. Thus, the outer portions are more likely to be in the user's peripheral vision such that, for example, the user's visual system cannot recognize artifacts and/or appreciate detail at the same levels as in the center of the graphics content. Accordingly, the user's experience may not be negatively impacted by rendering the outer regions at one or more lower resolutions and/or lower framerates and rendering efficiency is gained by not rendering those regions at a higher resolution and/or a higher framerate.

In some instances, identifying the region of the user's gaze may involve performing eye tracking to determine a region of the graphics content in the user's foveal vision. As used herein, a user's foveal vision can refer to vision in the center of the user's field of vision, where visual acuity is usually the highest. As additionally used herein, a region of graphics content in (or determined to be in) the user's foveal vision can refer to a region of the graphics content that represents the intersection of a projection of the user's foveal vision and a two-dimensional cross section of the graphics content that intersects the projection.

Once the region of the graphics content in the user's foveal vision is determined, this approach may include rendering the region at a higher resolution and/or higher framerate and rendering the other region(s) of the scene at one or more lower resolutions and/or one or more lower framerates. Again, because the regions in the user's foveal vision remain in higher resolution and/or a higher framerate, the user's experience may not be negatively impacted by rendering the region(s) in the user's peripheral vision at one or more lower resolutions and/or a lower framerate and rendering efficiency is gained by not rendering those region(s) at a higher resolution and/or higher framerate. As used herein, a user's peripheral vision can refer to vision that is outside of the user's foveal vision.

In other instances, the user's gaze may not be tracked and one or more regions of the graphics content may be statically rendered as in within the user's foveal vision (e.g., where the user's vision is expected to remain within one or more regions) and the other regions may be statically rendered as within the user's peripheral vision.

In further instances, an application may dynamically hint at which region should be rendered as if within the user's foveal vision (e.g., based on content, the scene, etc.).

As used herein, "foveated rendering" can refer to the process of rendering different regions of a scene based on different foveation parameters. The foveation parameters can include, but are not limited to, resolutions, framerates, AA levels, blurring levels, filters to apply, levels of geometric detail, and texture mipmap levels.

As used herein, "pose" information can refer to a position of the user (e.g., body and/or head) and/or a position of the user's eye(s) and/or gaze.

As further used herein, a "foveated region" can refer to a region in one or more frames of graphics content that is rendered using parameters that utilize more processing resources. In some embodiments, a foveated region can be determined based on the region being predetermined (i.e., static regions), determined, predicted, and/or presumed to be within the user's foveal vision. For example, foveated regions can be regions that are rendered at higher resolutions, at a higher framerate, with higher AA levels, with lower blurring levels, with filters to improve the quality of the region, at higher levels of geometric detail, at higher texture mipmap levels, and the like. In some embodiments, foveated regions can be adjusted based on sensor readings other than eye position/coordinates. For example, foveation parameters discussed herein can be lowered based on a determination that the user's eye(s) are not fully open. In contrast, "non-foveated regions" can refer to regions in one or more frames of graphics content that are rendered using parameters that utilize fewer processing resources. In some embodiments, a non-foveated region can be determined based on the region not being predetermined (i.e., static regions), determined, predicted, and/or presumed to be within the user's foveal vision (e.g., within the user's peripheral vision). For example, non-foveated regions can be regions that are rendered at lower resolutions, at lower framerates, with lower AA levels, with higher blurring levels, with filters to improve processing efficiency, at lower levels of geometric detail, at lower texture mipmap levels, and the like.

Rendering foveated regions differently than non-foveated regions may be particularly useful in mobile devices, which are often battery powered and have constrained form factors that can affect component sizes and available space for, for example, processors, batteries, and the like. Thus, power savings and processing efficiencies are of particular importance.

Another technical problem in computer graphics rendering, particularly in VR applications, is motion-to-photon latency. Motion-to-photon latency can be described as the time needed for a user's movement to be reflected on a display screen. If motion-to-photon latency is high (e.g., greater than 20 milliseconds (ms)), the user's experience may be negatively impacted because the display screen may not accurately reflect what the user expects to be on the screen based on their movement and/or the user may experience visual artifacts caused by the user's gaze moving to a region that was rendered based on the region being determined to be within the user's peripheral vision (e.g., rendered at a lower resolution/framerate or using parameters for more efficient/less detailed display). These effects can cause the user to experience disorientation and/or motion sickness, and may also break the VR experience for the user.

Motion-to-photon latency may also decrease the user experience in other applications that use eye or head tracking for foveated rendering such as mobile gaming applications, or applications displayed on very large screens.

As discussed in further detail below, these technical problems can be addressed using pose information (e.g., eye position) received after a rendering command is generated. Because the user's pose information is obtained after the graphics commands are sent to a graphics processor (e.g., a graphics processing unit (GPU)), the portion of graphics content is more likely to be displayed based on the user's position. The rendered frames can be warped using a reprojection technique (e.g., Asynchronous Timewarp) to adjust for any changes in the user's position after the rendering commands were generated. This provides the improved efficiency of foveated rendering while reducing eye motion-to-photon latency.

In some instances, when using a variable framerate for foveated rendering, as described herein, a further technical problem can result from a movement of an object within a scene, the movement of the user position (e.g., of the user's body and/or head), the movement of the user's eye position between frames, etc. For instance, if a foveated region is rendered at 30 FPS and a non-foveated region is rendered at 15 FPS, the non-foveated region may not be updated every time the foveated region is updated. Thus, an object that is within both regions and that moves position between two frames may cause artifacts at the boundary of the two regions. These artifacts could negatively affect the user's experience, cause disorientation, and/or cause motion sickness.

As discuss in further detail below, these technical problems can be addressed by combining, using a reprojection algorithm, the current partial frame of the foveated region with parts of a previous frame of the non-foveated regions. In further embodiments, the boundaries of the foveated regions and non-foveated regions can be blended to further smooth out the artifacts. This can provide the improved efficiency of foveated rendering using variable framerates, while reducing or eliminating the artifacts caused by the regions being rendered at different framerates.

Various configurations are now described with reference to the FIGS., where like reference numbers may indicate functionally similar elements. The systems and methods as generally described and illustrated in the FIGS. herein could be arranged and designed in a wide variety of different configurations. Thus, the following more detailed description of several configurations, as represented in the FIGS., is not intended to limit the scope, as claimed, but is merely representative of example systems and methods.

FIG. 1 depicts an illustrative example of a device 100 that can perform foveated rendering. The device 100 may include or be included in a graphics processing unit (GPU) or any other type of processing unit (e.g., a central processing unit (CPU) or a digital signal processor (DSP)) that is configured to perform a graphics processing operation using the graphics content 102, as an illustrative example. In some examples, the graphics content 102 may correspond to graphics content from an AR application, a VR application, a mixed reality application, or any other type of computer graphics application.

The graphics content 102 can include one or more frames, such as a first frame 114. The first frame 114 may include a first region 108 and one or more second regions 109. In various embodiments, the graphics content 102 can be generated based on a state of a computer graphics application, based on position information of the device 100 (e.g., based on global positioning system (GPS) coordinates, local coordinates, locations of real-world objects, etc.), based on an orientation of the device 100, and/or based on determined motion of the device 100, a user (e.g., head or eye position), or a real-world object captured by a camera (not pictured) of the device 100. In some embodiments, the device 100 can include a fovea estimation engine 104.

The device 100 can further include a rendering engine 112 that performs foveated rendering of graphics content 102. For example, the first region 108 of the first frame 114 may be a region that is rendered at a first framerate. Accordingly, the first frame 114 in the rendering engine 112 can include a higher framerate region 116 that is based on the first region 108 of the first frame 114 of the graphics content 102. Additionally, the second region(s) 109 of the first frame 114 may be region(s) that is/are rendered at lower framerate(s). For example, all of the second region(s) can be rendered at one fourth of the higher framerate, one of the second regions can be rendered at one half of the higher framerate and another of the second regions can be rendered at one eighth of the higher framerate, etc. The first frame 114 in the rendering engine 112 can include one or more lower framerate regions 118 that is based on the one or more second regions 109 of the first frame 114 of the graphics content 102.

In some implementations, the rendering engine 112 may be, may include, or may be part of a GPU or another type of processor.

In some embodiments, the fovea estimation engine 104 may be configured to generate an indication of a region of interest 106 (e.g., the first region 108) of the graphics content 102. For example, the fovea estimation engine 104 may receive eye position information from a sensor (not pictured) and determine a region of interest within a display that is within a user's foveal vision. For example, the eye position data can include an estimated direction of the user's gaze, as well as other sensor readings, such as coordinates of the user's pupil or a measure of the user's eye's openness. In some embodiments, the region of interest may be associated with the first region 108 of the first frame 114. The fovea estimation engine 104 can send an indication of the region of interest 106 to the rendering engine 112, and the rendering engine 112 can determine that the first region 108 should be the higher framerate region 116 and the second region(s) 109 (not in the region of interest) should be the one or more lower framerate regions 118.

In some implementations, the fovea estimation engine 104 may be part of the same processor as the rendering engine 112 while, in other implementations, the fovea estimation engine 104 may part of a separate processor.

In some examples, e.g., when the graphics content 102 and the device 100 correspond to an AR application, the device 100 may receive scene information 110. For example, the scene information 110 may be captured by a camera (not pictured) of the device 100, and the device 100 may superimpose the graphics content 102 on the scene information 110.

Figure 2:
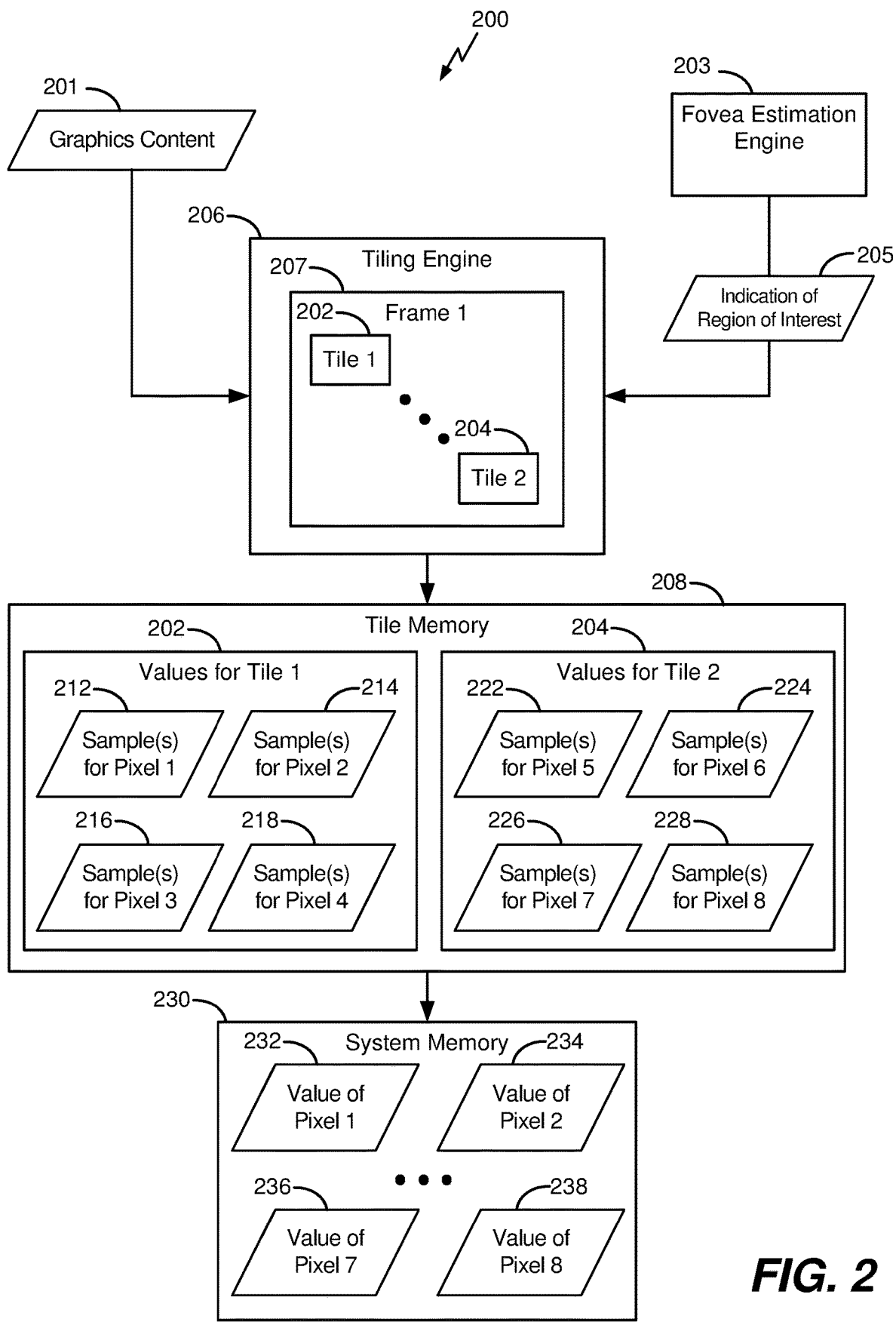
FIG. 2 is an example diagram of a device that can perform foveated rendering, consistent with disclosed embodiments.

Referring to FIG. 2, an illustrative example of a device 200 that can perform foveated rendering is depicted. In various embodiments, the device 200 can be the same or similar to the device 100 in FIG. 1. In the example of FIG. 2, the device 200 can be configured to render graphics content using tiled rendering and, accordingly, can include a tiling engine 206.

As described herein, tiled rendering can refer to a process of segmenting a frame of graphics content by a regular grid in optical space and rendering each section of the grid (i.e., each tile) separately. Using tiled rendering can provide technical advantages because the amount of memory and bandwidth may be reduced compared to rendering systems that draw the entire frame at once. Accordingly, tiled rendering may be useful in any type of device that can generate a display (e.g., laptop computers, desktop computers, advanced driver assistance systems, etc.), but is particularly common in mobile devices, such as cellular handsets (e.g., smartphones), VR and/or AR headsets (e.g., head mounted displays (HMDs)), smart glasses, smartwatches, and the like.

As used herein, a "tile" can refer to the grid in optical space (e.g., a 16×16 or a 32×32 grid of pixels) and/or a "tile" can refer to a section of tile memory where the samples values associated with the grid in optical space are stored.

As used herein, a "sample" or a "sample value" can refer to a value that represents the intersection of a channel (e.g., red, green, or blue) and a pixel. In some embodiments, reference to a sample can include a sample with multiple subsamples. For example, in red, green, blue (RGB) color space, a sample can include 3 subsamples, and in red, green, blue, alpha, (RGBA) color space, a sample can include 4 subsamples.

In some embodiments, the tiling engine 206 can be part of a rendering engine (e.g., the rendering engine 112 in FIG. 1). As shown in FIG. 2, the tiling engine 206 can receive graphics content 201. In some embodiments, the tiling engine 206 may also receive an indication of a region of interest 205 from a fovea estimation engine 203.

The tiling engine 206 can be configured to perform a tiling process associated with processing of the graphics content 201. The tiling process may include determining a set of tiles associated with the graphics content 201. For example, each frame of the graphics content 201 can be segmented into regions, where each region corresponds to a tile, multiple regions correspond to a tile, and/or a tile corresponds to multiple regions. To illustrate, FIG. 2 depicts that a first frame 207 may be segmented into a set of tiles that includes a first tile 202 (e.g., a first region of the first frame 207) and a second tile 204 (e.g., a second region of the first frame 207). The first frame 207 may include additional tiles for addition regions in the first frame 207.

In the example of FIG. 2, the tiling engine 206 may be configured to render samples of the graphics content 201 as a set of values for each tile associated with the first frame 207 (e.g., by performing an operation (for example, a vertex shading operation, a texture operation, a rasterization operation, one or more other operations, or a combination thereof) to determine a value for one or more samples for each pixel in the region associated with the tile). In some embodiments, a value of a sample may be associated with a color value (e.g., an RGB color value) and may be determined based on a location of the sample in the frame of the graphics content and objects that overlap that location in the frame. As used herein, a "pixel" can refer to a pixel in the final display (e.g., a 1920×1080 display has 2,073,600 pixels). Additionally, as also used herein, a "pixel" can refer to data in memory that ultimately corresponds to one pixel in the final display (if the resolution of the display is the same as in memory), more than one pixel in the final display (if the resolution of the display is larger than in memory), or less than one pixel and/or part of one pixel in the final display (if the resolution of the display is smaller than in memory).

Each tile can be rendered separately, values can be generated for each sample, and the values can be stored in a tile memory 208. In some embodiments, multi-sample antialiasing (MSAA) may be used. In MSAA, multiple samples can be associated with each pixel location in a display, and a value can be generated for each sample. For example, the tile memory 208 can include values for the first tile 202, which can include a sample or multiple samples for a first pixel 212, a sample or multiple samples for a second pixel 214, a sample or multiple samples for a third pixel 216, and a sample or multiple samples for a fourth pixel 218. Additionally, the tile memory 208 can include values for the second tile 204, which can include a sample or multiple samples for a fifth pixel 222, a sample or multiple samples for a sixth pixel 224, a sample or multiple samples for a seventh pixel 226, and a sample or multiple samples for an eighth pixel 228.

In some embodiments, the samples can then be stored in a system memory 230. For example, the one or more samples for the first pixel 212 can be stored as a value for the first pixel 232 in the system memory 230, the one or more samples for the second pixel 214 can be stored as a value for the second pixel 234 in the system memory 230, the one or more samples for the seventh pixel 226 can be stored as a value for the seventh pixel 236 in the system memory 230, and the one or more samples for the eighth pixel 228 can be stored as a value for the eighth pixel 238 in the system memory 230. The samples for the third-sixth pixels may also be stored as values in the system memory 230.

In further embodiments, the samples can additionally or alternatively be stored in other types of memory, such as, for example, local GPU memory (GMEM) or cache memory.

If MSAA is used, the samples may be downsampled to generate the value of a pixel (e.g., RGB color values). For example, if 2XMSAA is used, there may be two samples determined for each pixel in a display. When the values are transferred to, for example, the system memory 230, the samples may be downsampled (e.g., averaged together) to determine the value of the pixel in the system memory 230. In some embodiments, some tiles (e.g., tiles associated with a lower resolution) may have samples determined at a lower resolution than the display. Thus, the sample values may be upscaled to match the resolution of the display.

In some embodiments, as described in further detail below, all samples for all tiles may not be generated for each frame because different regions of the frame may be rendered at different framerates. For example, one tile (e.g., the first tile 202) may be generated for the first frame 207 and the samples for another tile (e.g., the second tile 204) may be retrieved from an eyebuffer (e.g., samples that were generated for a previous frame), as described in further detail below. In another example, part of one tile (e.g., the first pixel 212 of the first tile 202) may be generated for the first frame and another part of the tile (e.g., the fourth pixel 218 of the first tile 202) may be retrieved from an eyebuffer, as also described in further detail below. The samples in the tile memory 208 can then be stored in the system memory 230.

The values of the pixels stored in the system memory 230 can then be used to generate a display. For example, the values can indicate RGB color values of pixels, and the pixels can be set accordingly to generate the display.

As used herein, an eyebuffer can refer to any type of buffer and/or memory that can be used to store data for a full frame, data for a partial frame, metadata for a partial frame, or a combination thereof. In some embodiments, storage of data can be temporary, as the data in the eyebuffer can be continually overwritten by subsequent frames (full or partial). In other embodiments, the eyebuffer can refer to storage in general memory, and may not require explicitly reserved hardware or portions thereof. Accordingly, in some instances, storing in an eyebuffer can simply refer to storing data in any type of memory (e.g., non-transitory memory).

The example of FIG. 2 illustrates aspects of using tiled rendering to generate graphics content. Alternatively or additionally other techniques may be used to generate the graphics content, consistent with disclosed embodiments.

Figure 3:
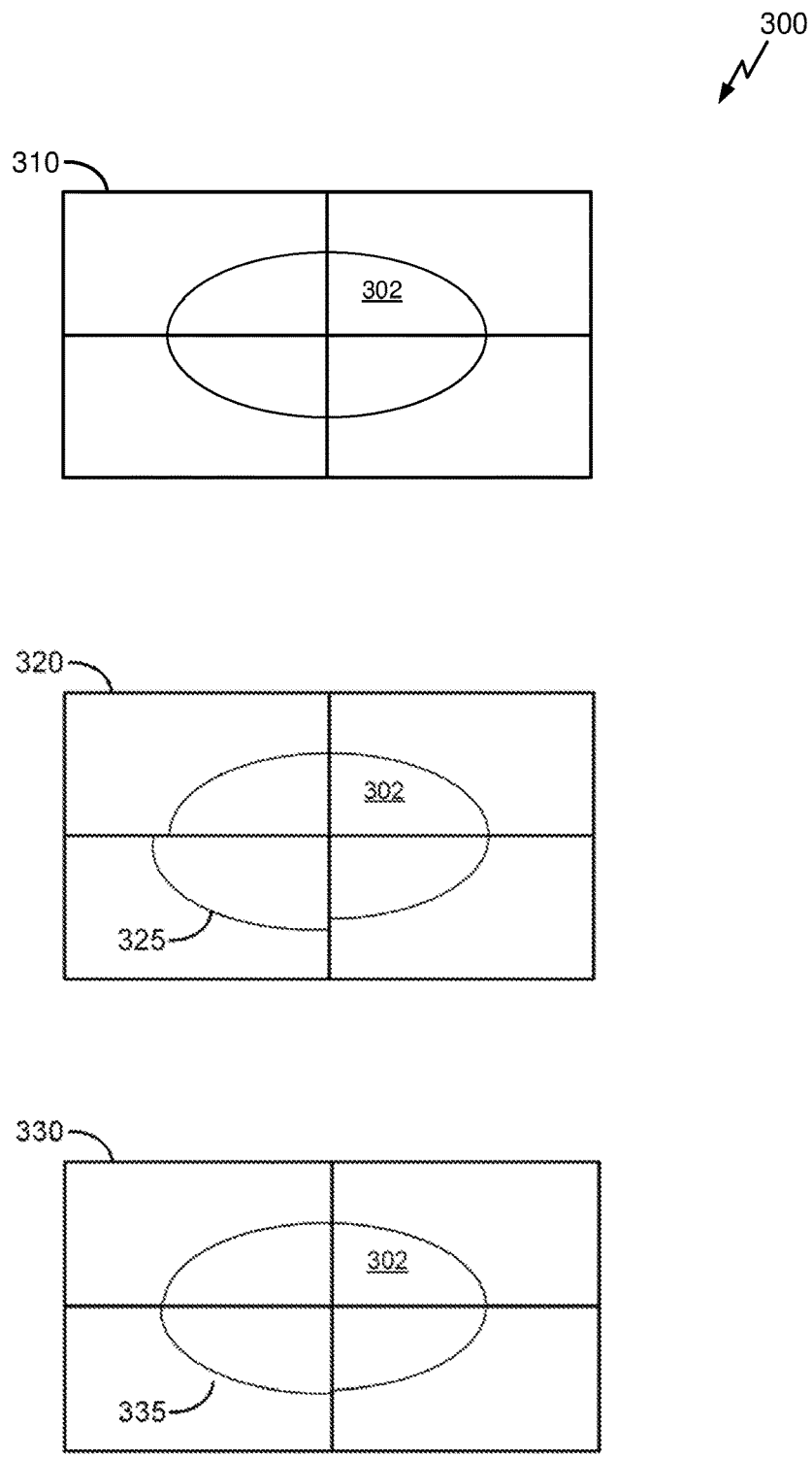
FIG. 3 is an example illustration of foveated rendering using variable framerates, consistent with disclosed embodiments.

Referring to FIG. 3, an example illustration of foveated rendering using variable framerate is shown. FIG. 3 depicts three example frames of a moving object 302 being displayed using tiled rendering. Each frame is segmented into four frames and the object 302 is rendered in all four tiles.

The first frame 310, represents an initial position of the object 302. Additionally, the frame 310 may represent a fully rendered frame. For example, as described in further detail below, some tiles (corresponding to foveated regions) may be rendered at a higher frame rate and some tiles (corresponding to a non-foveated region) may be rendered a lower frame rate. Accordingly, if some tiles are rendered at, for example, 60 FPS and other tiles are rendered at 30 FPS, half of the frames can be fully rendered and half of the frames can be rendered for only tiles corresponding to the foveated regions. The frame 310 can represent a frame that is rendered for the foveated and non-foveated regions (i.e., fully rendered).

The second frame 320, represents a frame that is subsequent to the frame 310 and that is rendered when the object 302 is a second position. Additionally, the frame 320 may represent a partially rendered frame. In particular, the tile 325 of the frame 320 may be rendered at a higher framerate than other tiles in the frame 320. Thus, the other tiles in the frame 320 may be the same as in the frame 310 because those tiles were not rendered in frame 320 and the values were copied from the frame 310.

The frame 320 may represent foveated rendering with variable framerates without a correction process, such as, for example, warp correction and/or blending. Thus, because the object 302 moved between frames 310 and 320 and the values of some of the tiles were not updated, there are artifacts between the higher framerate regions and the lower framerate regions. Such artifacts could be described, in various examples, as tearing, discontinuities, jumps, ghosting affects, and the like.

The third frame 330, represents a frame that is subsequent to the frame 310 and that is rendered when the object 302 is the second position. Additionally, the frame 330 may represent a partially rendered frame. In particular, the tile 335 of the frame 330 may be rendered at a higher framerate than other tiles in the frame 330. Thus, the other tiles in the frame 330 may be based on samples from the frame 310 because those tiles were not rendered in frame 330 and the values were initially copied from the frame 310.

The frame 330 may represent foveated rendering with variable framerates with a correction process, such as, for example, warp correction and/or blending. Thus, even though the object 302 moved between frames 310 and 330 and the values of some of the tiles were not initially updated, the object 302 has been warped slightly (e.g., to a different position) and tearing artifacts (such as those shown in the frame 320) have been reduced or eliminated between the higher framerate regions and the lower framerate regions. Foveated rendering with variable framerates, including using warp correction and/or blending to reduce or eliminate artifacts, is described in further detail below.

Figure 4:
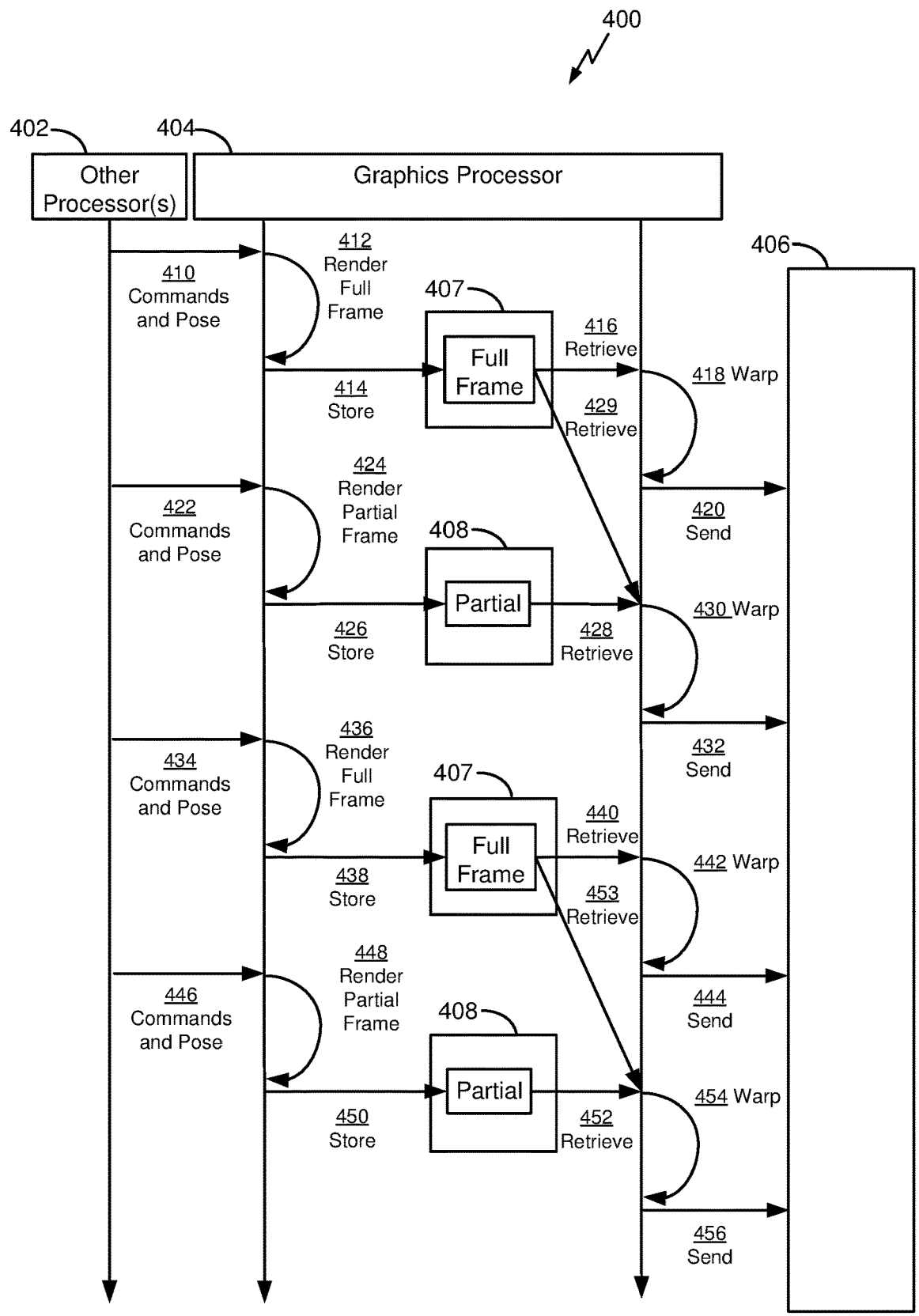
FIG. 4 is an example illustration of foveated rendering using variable framerates, consistent with disclosed embodiments.

Referring to FIG. 4, an example illustration of foveated rendering using variable framerates is shown. FIG. 4 depicts a process 400 that can be performed by a computing device that utilizes foveated rendering with a variable framerate, such as the device 100 or the device 200, shown in FIGS. 1 and 2, respectively. Additionally, in some embodiments, the process 400 described in FIG. 4 can be performed using a graphics processor 404 (e.g., a GPU) and one or more other processors 402 (e.g., a CPU, a GPU, a DSP, and the like) of a device. Further, in additional embodiments, the process 400 described in FIG. 4 can be performed using eyebuffers 407 and 408 and system memory 406. In some embodiments, the eyebuffers 407 and 408 can be part of the graphics processor 404 and, in other embodiments, the eyebuffers 407 and 408 can be separate from the graphics processor 404. In further embodiments, the eyebuffer 407 can store a full frame and the eyebuffer 408 can store a partial frame. Thus, in some implementations, the eyebuffer 407 can be larger (i.e., can store more data) than the eyebuffer 408. In other embodiments, the eyebuffers 407 and 408 can correspond to the same buffer/memory that can, for example, store both a full frame and a partial frame. In the example shown in FIG. 4, the foveated regions are rendered at a full framerate (e.g., 120 FPS, 90 FPS, 60 FPS, 30 FPS, etc.) and the non-foveated regions are rendered at half of the full frame rate (e.g., 60 FPS, 45 FPS, 30 FPS, 15 FPS, etc.).

At element 410, the one or more processors 402 can determine current pose information (e.g., head, eye, or gaze positions) and generate rendering commands based on the current pose information and can send the commands and the current pose information to the graphics processor 404. For example, the one or more processors 402 can determine what to render based on the head position and which regions are within the user's foveal vision based on the eye position.

At element 412, the graphics processor 404 can render a full frame based on the commands and pose information received from the one or more processors 402. For example, the graphics processor 404 can execute the commands to render the full frame. Additionally, in some embodiments, the graphics processor 404 can render different regions based on the current eye position using different foveation parameters (e.g., resolutions, AA levels, blurring levels, filters to apply, levels of geometric detail, texture mipmap levels, etc.).

At element 414, the graphics processor 404 can store the rendered full frame in the eyebuffer 407.

At element 416, the graphics processor 404 can retrieve the rendered full frame from the eyebuffer 407 and, at element 418, the graphics processor 404 can perform a warp (i.e., a reprojection technique, such as Asynchronous Timewarp), also referred to as a warping algorithm, to adjust for the time passed after the rendering commands were generated (in element 410). In some embodiments, the graphics processor 404 may receive updated pose information (e.g., head and/or eye positions) and further perform the warp based on the updated pose information and the time that has passed. For instance, the head and/or eye position of the user may change between when the commands were generated in element 410 and the warp was performed in element 418, thus, by warping the rendered full frame, the new position of the user can be accounted for, the rendered objects can be adjusted, as needed, and the foveation parameters can be adjusted, as needed. In some embodiments, the updated pose information can be received from the one or more other processors 402 and can be determined after the full frame is rendered in element 412.

At element 420, the graphics processor 404 can send the warped full frame to the system memory 406, where the full frame can subsequently be output to a display.

At element 422, the one or more processors 402 can determine current pose information and generate rendering commands based on the current pose information and can send the commands and the current pose information to the graphics processor 404. In some embodiments, the one or more processors 402 may only generate rendering commands for regions of the current frame that are within the user's foveal vision (e.g., based on the current eye position). In further embodiments, the one or more processors 402 may also generate and send metadata indicating which regions of the current partial frame are being rendered and/or which regions of the current partial frame are not being rendered. Thus, processing resources and bandwidth that would be used to generate and send the remaining regions of the frame may not be used for the current frame.

At element 424, the graphics processor 404 can render a partial frame based on the commands and pose information received from the one or more processors 402. For example, the graphics processor 404 can execute the commands to render the partial frame where not every region of the frame is rendered. Additionally, in some embodiments, the graphics processor 404 can render different regions in the partial frame based on the current eye position using different foveation parameters (e.g., resolutions, AA levels, blurring levels, filters to apply, levels of geometric detail, texture mipmap levels, etc.). For instance, the partial frame could include different regions with different resolutions.

At element 426, the graphics processor 404 can store the rendered partial frame in the eyebuffer 408. In some embodiments, the graphics processor 404 can additionally store the metadata, that indicates which regions are rendered, in the eyebuffer 408

At element 428, the graphics processor 404 can retrieve the rendered partial frame from the eyebuffer 408. At element 429, the graphics processor 404 can also retrieve the rendered previous full frame (or parts thereof) from the eyebuffer 407. In some embodiments, the graphics processor 404 may determine which parts of the previous full frame to retrieve based on the metadata indicating which regions are rendered in the current partial frame.

At element 430, the graphics processor 404 can perform a warp to adjust for the time passed after the rendering commands were generated and up until the warp is performed. In some embodiments, the graphics processor 404 may receive updated pose information and perform the warp based on the updated pose information and the time that has passed. In further embodiments, the graphics processor 404 may warp the partial frame retrieved from the eyebuffer 408 differently from the full frame (or parts thereof) retrieved from the eyebuffer 407. Because the full frame was rendered prior to the partial frame, more time has passed since the commands for the full frame were generated, meaning the user has had more time to change positions, objects in the scene have had more time to move, etc. Thus, a fully rendered frame can be created by performing a warp using the partial frame, parts of the full frame that are in different regions than the partial frame, current pose information (e.g., received by the graphics processor 404 after storing the partial frame in the eyebuffer 408), the time that passed between generating the commands for the full frame and generating the current pose information, and/or the time that passed between generating the commands for the partial frame and generating the current pose information. Additionally, in some embodiments, the graphics processor 404 can blend at least a portion of the combined frame, as discussed in further detail below. For example, the graphics processor 404 can perform blending at or near boundaries of the partial frame and the full frame.

At element 432, the graphics processor 404 can send the warped full frame (combining the full frame from the eyebuffer 407 and the partial frame from the eyebuffer 408) to the system memory 406, where the full frame can subsequently be output to a display.

At element 434, the one or more processors 402 can determine current pose information (e.g., head and eye positions) and generate rendering commands based on the current pose information and can send the commands and the current pose information to the graphics processor 404. For example, the one or more processors 402 can determine what to render based on the head position and which regions are within the user's foveal vision based on the eye position. Additionally, because, in the example shown in FIG. 4, the foveated regions are rendered at a full framerate and the non-foveated regions are rendered at half of the full frame rate, at element 434, the commands can correspond to rendering another full frame.

At element 436, the graphics processor 404 can render the full frame based on the commands and pose information received from the one or more processors 402.

At element 438, the graphics processor 404 can store the rendered full frame in the eyebuffer 407. In some embodiments, the rendered current full frame can replace at least part of a previous full frame in the eyebuffer 407.

At element 440, the graphics processor 404 can retrieve the rendered full frame from the eyebuffer 407 and, at element 442, the graphics processor 404 can perform a warp to adjust for the time passed after the rendering commands were generated (in element 434) and/or based on updated pose information.

At element 444, the graphics processor 404 can send the warped full frame to the system memory 406, where the full frame can subsequently be output to a display.

At element 446, the one or more processors 402 can determine current pose information (e.g., head and eye positions) and generate rendering commands based on the current pose information and can send the commands and the current pose information to the graphics processor 404. In some embodiments, the one or more processors 402 may only generate rendering commands for regions of the current frame that are within the user's foveal vision (e.g., based on the current eye position) so that every other frame is only partially rendered. In further embodiments, the one or more processors 402 may also generate and send metadata indicating which regions of the current partial frame are being rendered and/or which regions of the current partial frame are not being rendered.

At element 448, the graphics processor 404 can render a partial frame based on the commands and pose information received from the one or more processors 402. For example, the graphics processor 404 can execute the commands to render the partial frame where not every region of the frame is rendered.

At element 450, the graphics processor 404 can store the rendered partial frame in the eyebuffer 408. In some embodiments, the graphics processor 404 can additionally store the metadata, that indicates which regions are rendered, in the eyebuffer 408. In further embodiments, the rendered current partial frame and/or the current metadata may replace at least part of a previous partial frame and/or previous metadata stored in the eyebuffer 408.

At element 452, the graphics processor 404 can retrieve the rendered partial frame from the eyebuffer 408. At element 453, the graphics processor 404 can also retrieve the rendered previous full frame (or parts thereof) from the eyebuffer 407. In some embodiments, the graphics processor 404 may determine which parts of the previous full frame to retrieve based on the metadata indicating which regions are rendered in the current partial frame.

At element 454, the graphics processor 404 can perform a warp to adjust for the time passed after the rendering commands were generated and up until the warp is performed. In some embodiments, the graphics processor 404 may receive updated pose information and further perform the warp based on the updated pose information and the time that has passed. In further embodiments, the graphics processor 404 may warp the partial frame retrieved from the eyebuffer 408 differently from the full frame (or parts thereof) retrieved from the eyebuffer 407, as discussed above, to generate a warped full frame. Additionally, in some embodiments, the graphics processor can blend a portion of the combined frame, as discussed in further detail below.

At element 456, the graphics processor 404 can send the warped full frame (combining the full frame from the eyebuffer 407 and the partial frame from the eyebuffer 408) to the system memory 406, where the full frame can subsequently be output to a display.

Figure 5A:
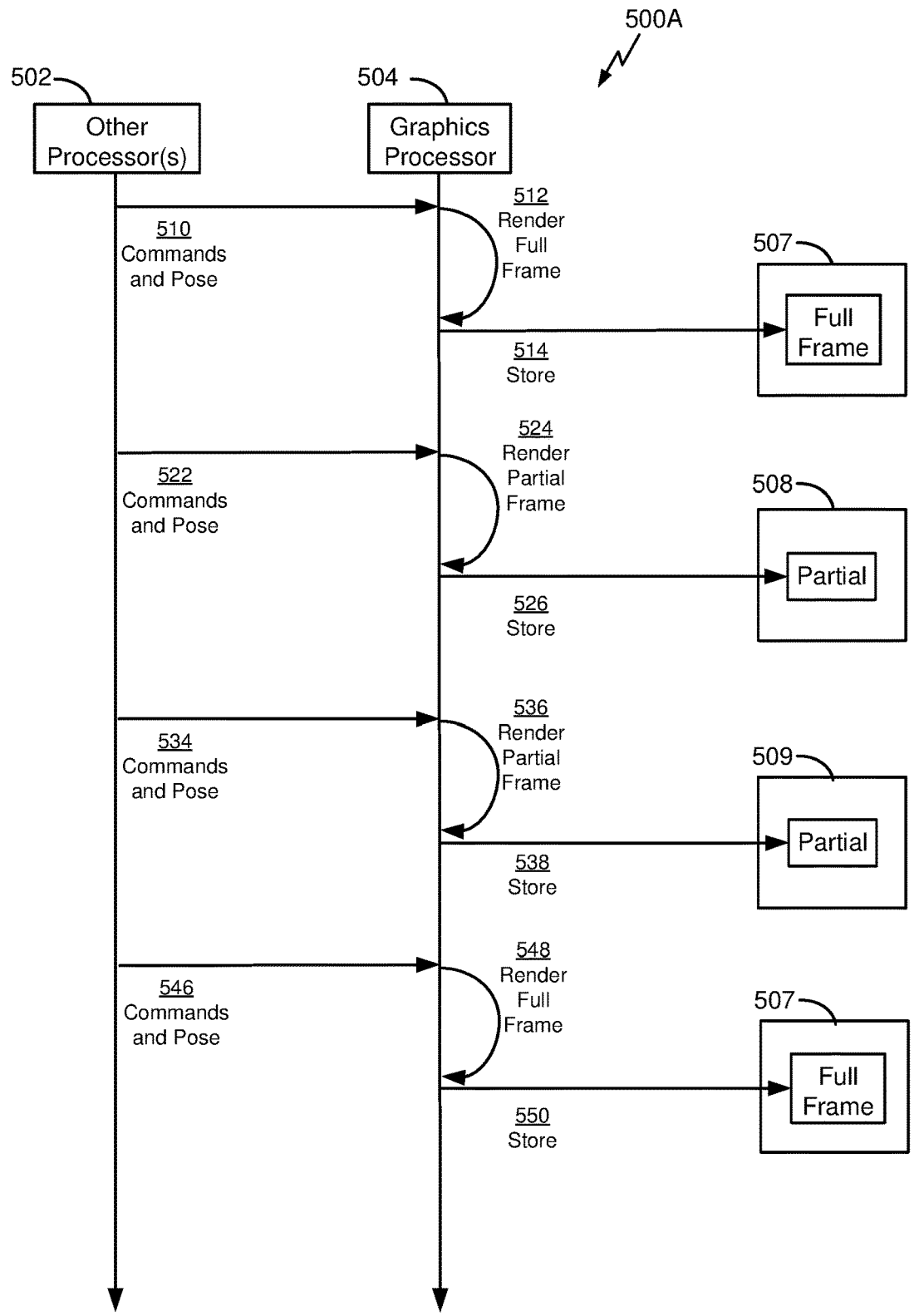
FIG. 5A is an example illustration of foveated rendering using variable framerates, consistent with disclosed embodiments.
Figure 5B:
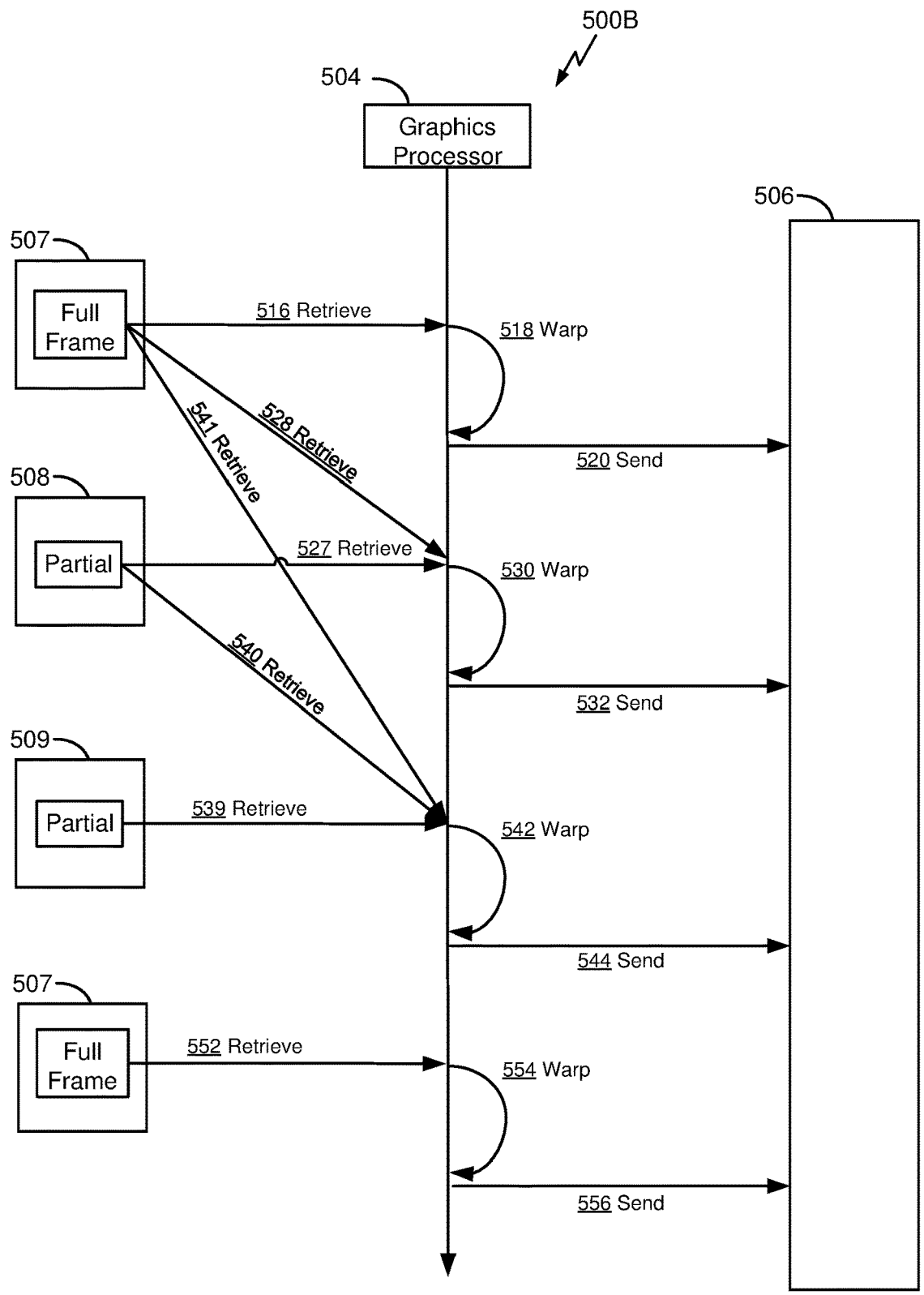
FIG. 5B is an example illustration of foveated rendering using variable framerates, consistent with disclosed embodiments.

Referring to FIGS. 5A and 5B, an example illustration of foveated rendering using variable framerates is shown. FIG. 5 depicts a process (500A and 500B) that can be performed by a computing device that utilizes foveated rendering with a variable framerate, such as the device 100 or the device 200, shown in FIGS. 1 and 2, respectively. Additionally, in some embodiments, the process (500A and 500B) described in FIG. 5 can be performed using a graphics processor 504 (e.g., a GPU) and one or more other processors 502 (e.g., a CPU, a GPU, a DSP, and the like) of a device. Further, in some embodiments, the process (500A and 500B) described in FIG. 5 can be performed using eyebuffers 507, 508, and 509 and system memory 506. In some embodiments, the eyebuffers 507, 508, and 509 can be part of the graphics processor 504 and, in other embodiments, the eyebuffers 507, 508, and 509 can be separate from the graphics processor 504. In further embodiments, the eyebuffer 507 can store a full frame and the eyebuffers 508 and 509 can each store a partial frame. Thus, in some implementations, the eyebuffer 507 can be larger (i.e., can store more data) than the eyebuffers 508 and 509. In other embodiments, the eyebuffers 507, 508, and 509 can correspond to the same buffer/memory that can, for example, store all of a full frame and two partial frames. In the example shown in FIG. 5, the foveated regions are rendered at a full framerate (e.g., 120 FPS, 90 FPS, 60 FPS, 30 FPS, etc.) and the non-foveated regions are rendered at one-third of the full frame rate (e.g., 40 FPS, 30 FPS, 20 FPS, 10 FPS, etc.).

At element 510, the one or more processors 502 can determine current pose information (e.g., head, eye, or gaze positions) and generate rendering commands based on the current pose information and can send the commands and the current pose information to the graphics processor 504. For example, the one or more processors 502 can determine what to render based on the head position and which regions are within the user's foveal vision based on the eye position.

At element 512, the graphics processor 504 can render a full frame based on the commands and pose information received from the one or more processors 502. For example, the graphics processor 504 can execute the commands to render the full frame. Additionally, in some embodiments, the graphics processor 504 can render different regions based on the current eye position using different foveation parameters (e.g., resolutions, AA levels, blurring levels, filters to apply, levels of geometric detail, texture mipmap levels, etc.).

At element 514, the graphics processor 504 can store the rendered full frame in the eyebuffer 507.

At element 516, the graphics processor 504 can retrieve the rendered full frame from the eyebuffer 507 and, at element 518, the graphics processor 404 can perform a warp to adjust for the time passed after the rendering commands were generated (in element 510). In some embodiments, the graphics processor 504 may receive updated pose information (e.g., head and/or eye positions) and further perform the warp based on the updated pose information and the time that has passed. In some embodiments, the updated pose information can be received from the one or more other processors 502 and can be determined after the full frame is rendered in element 512.

At element 520, the graphics processor 504 can send the warped full frame to the system memory 506, where the full frame can subsequently be output to a display.

At element 522, the one or more processors 502 can determine current pose information and generate rendering commands based on the current pose information and can send the commands and the current pose information to the graphics processor 504. In some embodiments, the one or more processors 502 may only generate rendering commands for regions of the current frame that are within the user's foveal vision (e.g., based on the current eye position). In further embodiments, the one or more processors 502 may also generate and send metadata indicating which regions of the current partial frame are being rendered and/or which regions of the current partial frame are not being rendered. Thus, processing resources and bandwidth that would be used to generate and send the remaining regions of the frame may not be used for the current frame.

At element 524, the graphics processor 504 can render a partial frame based on the commands and pose information received from the one or more processors 502. For example, the graphics processor 504 can execute the commands to render the partial frame where not every region of the frame is rendered. Additionally, in some embodiments, the graphics processor 504 can render different regions in the partial frame based on the current eye position using different foveation parameters (e.g., resolutions, AA levels, blurring levels, filters to apply, levels of geometric detail, texture mipmap levels, etc.). For instance, the partial frame could include different regions with different resolutions.

At element 526, the graphics processor 504 can store the rendered partial frame in the eyebuffer 508. In some embodiments, the graphics processor 504 can additionally store the metadata, that indicates which regions are rendered, in the eyebuffer 508.

At element 527, the graphics processor 504 can retrieve the rendered partial frame from the eyebuffer 508. At element 528, the graphics processor 504 can also retrieve the rendered previous full frame (or parts thereof) from the eyebuffer 507. In some embodiments, the graphics processor 504 may determine which parts of the previous full frame to retrieve based on the metadata indicating which regions are rendered in the current partial frame.

At element 530, the graphics processor 504 can perform a warp to adjust for the time passed after the rendering commands were generated and up until the warp is performed. In some embodiments, the graphics processor 504 may receive updated pose information and perform the warp based on the updated pose information and the time that has passed. In further embodiments, the graphics processor 504 may warp the partial frame retrieved from the eyebuffer 508 differently from the full frame (or parts thereof) retrieved from the eyebuffer 507. Because the full frame was rendered prior to the partial frame, more time has passed since the commands for the full frame were generated, meaning the user has had more time to change positions, objects in the scene have had more time to move, etc. Thus, a fully rendered frame can be created by performing a warp using the partial frame, parts of the full frame that are in different regions than the partial frame, current pose information (e.g., received by the graphics processor 504 after storing the partial frame in the eyebuffer 508), the time that passed between generating the commands for the full frame and generating the current pose information, and the time that passed between generating the commands for the partial frame and generating the current pose information. Additionally, in some embodiments, the graphics processor 504 can blend at least a portion of the combined frame, as discussed in further detail below. For example, the graphics processor 504 can perform blending at or near boundaries of the partial frame and the full frame.

At element 532, the graphics processor 504 can send the warped full frame (combining the full frame from the eyebuffer 507 and the partial frame from the eyebuffer 508) to the system memory 506, where the full frame can subsequently be output to a display.

At element 534, the one or more processors 502 can determine current pose information, generate rendering commands based on the current pose information, and can send the commands and the current pose information to the graphics processor 504. In some embodiments, the one or more processors 502 may only generate rendering commands for regions of the current frame that are within the user's foveal vision (e.g., based on the current eye position). In further embodiments, the one or more processors 502 may also generate and send metadata indicating which regions of the current partial frame are being rendered and/or which regions of the current partial frame are not being rendered. Thus, processing resources and bandwidth that would be used to generate and send the remaining regions of the frame may not be used for the current frame.

At element 536, the graphics processor 504 can render a partial frame based on the commands and pose information received from the one or more processors 502. For example, the graphics processor 504 can execute the commands to render the partial frame where not every region of the frame is rendered. Additionally, in some embodiments, the graphics processor 504 can render different regions in the partial frame based on the current eye position using different foveation parameters.

At element 538, the graphics processor 504 can store the rendered partial frame in the eyebuffer 509. In some embodiments, the graphics processor 504 can additionally store the metadata, that indicates which regions are rendered, in the eyebuffer 509

At element 539, the graphics processor 504 can retrieve the rendered partial frame from the eyebuffer 509. At element 540, the graphics processor 504 can also retrieve the rendered previous partial frame (or parts thereof) from the eyebuffer 508. At element 541, the graphics processor 504 can also retrieve the rendered previous full frame (or parts thereof) from the eyebuffer 507. In some embodiments, the graphics processor 504 may determine which parts of the previous full frame to retrieve based on the metadata indicating which regions are rendered in the current partial frame. In further embodiments, the graphics processor 504 may determine which parts of the previous partial frame to retrieve based on the metadata indicating which regions are rendered in the current partial frame. In additional embodiments, the graphics processor 504 can determine whether to retrieve the previous full frame and the previous partial frame at all. For example, if the previous partial frame covers the same region as the current partial frame, then the graphics processor 504 may not retrieve the previous partial frame. As an additional example, if the frame is split into two regions and the previous partial frame covers a first region and the current partial frame covers the second region, then the graphics processor 504 may not retrieve the previous full frame.

At element 542, the graphics processor 504 can perform a warp to adjust for the time passed after the rendering commands were generated and up until the warp is performed. In some embodiments, the graphics processor 504 may receive updated pose information and perform the warp based on the updated pose information and the time that has passed. In further embodiments, the graphics processor 504 may warp the partial frame retrieved from the eyebuffer 509 differently from the partial frame (or parts thereof) retrieved from the eyebuffer 508 and the full frame (or parts thereof) retrieved from the eyebuffer 507. Because the full frame and the previous partial frame were rendered prior to the current partial frame, more time has passed since the commands for the full frame and the previous partial frame were generated, meaning the user has had more time to change positions, objects in the scene have had more time to move, etc. Thus, a fully rendered frame can be created by performing a warp using the current partial frame, parts of the previous partial frame that are in different regions than the current partial frame, and parts of the previous full frame that are in different regions than the current partial frame and the previous partial frame, current pose information (e.g., received by the graphics processor 504 after storing the partial frame in the eyebuffer 508), the time that passed between generating the commands for the full frame and generating the current pose information, the time that passed between generating the commands for the previous partial frame and generating the current pose information, and the time that passed between generating the commands for the current partial frame and generating the current pose information. Additionally, in some embodiments, the graphics processor 504 can blend at least a portion of the combined frame, as discussed in further detail below. For example, the graphics processor 504 can perform blending at or near boundaries of the partial frame(s) and the full frame.

In the above description, parts of the previous partial frame are used in performing the warp in element 542. However, in some embodiments, the previous partial frame may not be retrieved and used in the element 542. For instance, if the region(s) of the frame in the foveal vision of the user have not changed from the previous frame, then the current partial frame may cover the same region as the previous partial frame. Thus, the previous partial frame may not be used to generate the current frame. In other embodiments, only parts of the previous partial frame may be retrieved based on areas that are not covered by the current partial frame, and the like.

At element 544, the graphics processor 504 can send the warped full frame (combining the full frame from the eyebuffer 507, the previous partial frame from the eyebuffer 508, and the current partial frame from the eyebuffer 509) to the system memory 506, where the full frame can subsequently be output to a display.

At element 546, the one or more processors 502 can determine current pose information and generate rendering commands based on the current pose information and can send the commands and the current pose information to the graphics processor 504.

At element 548, the graphics processor 504 can render a full frame based on the commands and pose information received from the one or more processors 502. For example, the graphics processor 504 can execute the commands to render the full frame. Additionally, in some embodiments, the graphics processor 504 can render different regions based on the current eye position using different foveation parameters (e.g., resolutions, AA levels, blurring levels, filters to apply, levels of geometric detail, texture mipmap levels, etc.).

At element 550, the graphics processor 504 can store the rendered full frame in the eyebuffer 507, which can, in some embodiments, replace at least part of a previous full frame (e.g., the previous full frame stored in element 514).

At element 552, the graphics processor 504 can retrieve the rendered full frame from the eyebuffer 507 and, at element 554, the graphics processor 404 can perform a warp to adjust for the time passed after the rendering commands were generated (in element 546). In some embodiments, the graphics processor 504 may receive updated pose information (e.g., head and/or eye positions) and further perform the warp based on the updated pose information and the time that has passed. In some embodiments, the updated pose information can be received from the one or more other processors 502.

At element 556, the graphics processor 504 can send the warped full frame to the system memory 506, where the full frame can subsequently be output to a display. Subsequently, partial frames can be generated for the next two cycles that may be used in combination with parts of the full frame stored in the eyebuffer 507, similar to the process discussed above.

Figure 6:
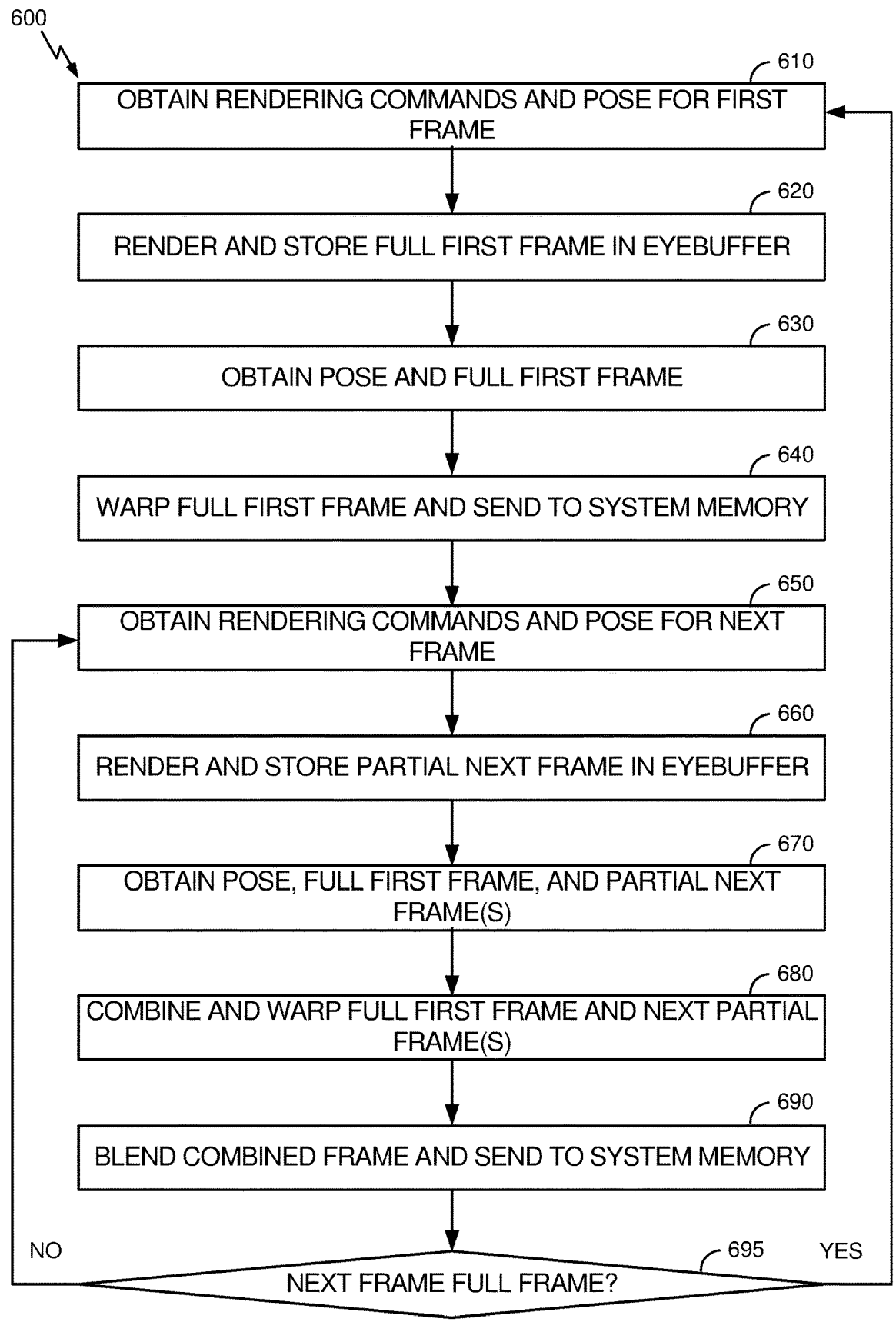
FIG. 6 is an example illustration of a process of foveated rendering using variable framerates, consistent with disclosed embodiments.

Referring to FIG. 6, an example process 600 of foveated rendering using variable framerates is shown. In various embodiments, the example process 600 can be performed by a computing device, such as the device 100 depicted in FIG. 1, the device 200 depicted in FIG. 2, or a device 700 described below with regard to FIG. 7. In further embodiments, the example process 600 can be performed using one or more processors, such as a CPU, a DSP, and/or a GPU. For example, the process 600 can be performed by the graphics processor 404 shown in FIG. 4 and/or the graphics processor 504 shown in FIGS. 5A and 5B. Additionally or alternatively, in some embodiments, the computing device can be a VR headset, an AR headset, a cellular handset (or other wireless communication device), a laptop computer, a tablet computer, a desktop computer, a server, a set of networked devices, an advanced driver assistance system, a smartwatch, smart glasses, and the like. In various embodiments, the computing device may include, may be connected to, and/or may be able to transmit information to a display device.

In block 610, the processor can obtain rendering commands and pose information for a first frame. In some embodiments, the rendering commands can include samples from an application (e.g., a VR application, mobile gaming applications, or applications displayed on large screens) and instructions including, for example, instructions to downscale the samples, instructions on how to downscale the samples (e.g., how to weight the samples), instructions to upscale the samples, etc. In other embodiments, the pose information can include, for example, a position of the user's head, a position of the user's eyes, a location of the user's gaze, and/or positions of objects in the environment.

In further embodiments, the rendering commands can be obtained from the application and the pose information can be obtained from one or more sensors. In some examples, the processor can determine rendering commands based, at least partially, on the pose information.

In block 620, the processor can render a full first frame of graphics content based on the rendering commands and the pose information obtained in 610. For example, the processor can execute the rendering commands to render the full frame. Additionally, in some embodiments, the processor can render different regions based on the pose information using different foveation parameters (e.g., resolutions, AA levels, blurring levels, filters to apply, levels of geometric detail, texture mipmap levels, etc.). Additionally, in block 620, the processor can store the full first frame in an eyebuffer. In some embodiments, the processor can overwrite a previous full frame that was stored in the eyebuffer when storing the current full frame.

In further embodiments, the full first frame of graphics content can be rendered on a device that is different than the device that will display the full first frame of graphics content to a user. A similar process can be performed for partial frames, discussed below. Such embodiments can be referred to as "split rendering." Accordingly, the processor (of a server) can obtain the rendering commends (from itself, from another processor of the server, from a user device, etc.), render the full first frame, and send the full first frame to the user device.

In block 630, the processor can obtain additional pose information and the full first frame from the eyebuffer. For example, in some embodiments, the pose of the user may have changed from the pose obtained in block 610 and the processor can obtain updated pose information from one or more sensors. In other embodiments, the pose information obtained in block 630 can be the same pose information obtained in block 610.

In block 640, the processor can warp the full first frame and send the warped full first frame to system memory. In some embodiments, warping can include using a reprojection algorithm (e.g., an asynchronous reprojection, such as Asynchronous TimeWarp (ATW)) and inputting one or more of the full first frame, the latest pose information (if different from the original pose information used to generate the rendering commands for and/or render the first frame), and/or the amount of time that passed from when the original pose data was determined. The reprojection algorithm can shift the rendered image to adjust for any pose changes (or estimated changes) that occurred after the original pose data was determined. The warped full first frame can be sent to system memory, and, from system memory, the full first frame can be output to a display.

In further embodiments, e.g., for split rendering, the processor (of a user device) can further render and/or warp the full first frame received from a server based the additional pose information that was not available to the server when the commands were generated. A similar process can be performed for partial frames, discussed below. Thus, larger processing resources of a server can be used to perform a larger part of the rendering, and the smaller processing resources of the user device can be used to fine-tune the rendered frame using the latest pose information obtained by the user device. This can allow the user device to use less power and be smaller in size and weight, while still being able to effectively process the frame.

In some embodiments, the full first frame can be rendered to cover more area than is displayed on the display. In such embodiments, the warping in block 640 can include selecting a subset of the over-rendered full first frame corresponding to the latest pose information and sending the selected subset to system memory.

In other embodiments, full frames, such as the full first frame described above, may not be warped and can be output from the eyebuffer to system memory.

In block 650, the processor can obtain rendering commands and pose information for a next frame. In some embodiments, the rendering commands can correspond to a partial frame, and the rendering commands can include coordinates of the partial frame that are already selected based on the pose information. In other embodiments, the processor can obtain rendering commands for a full frame, and only part of the full frame may be rendered in block 660 based on the pose information. For example, the pose information can include an eye position that is used to determine an area within the frame that is currently within the user's foveal vision. Accordingly, the subset of the full frame corresponding to the area within the user's foveal vision may correspond to the coordinates of the partial frame.

In block 660, the processor can render a partial frame of graphics content based on the rendering commands and the pose information obtained in 650. For example, the processor can execute the rendering commands corresponding to a partial frame or select rendering commands to execute based on the pose information to render a partial frame. Additionally, in some embodiments, the processor can render different regions of the partial frame based on the pose information using different foveation parameters. Additionally, in block 660, the processor can store the rendered partial frame in an eyebuffer. In some embodiments, the processor can overwrite a previous partial frame that was stored in the eyebuffer when storing the current full frame. In further embodiments, the processor can additional store metadata indicating which region of the full frame corresponds to the partial frame stored in the eyebuffer.

In block 670, the processor can obtain additional pose information and the full frame (stored in element 620) from the appropriate eyebuffer and any partial frames (stored in element 660) from the appropriate eyebuffer(s). For example, in some embodiments, the pose of the user may have changed from the pose obtained in block 650 and the processor can obtain updated pose information from one or more sensors. In other embodiments, the pose information obtained in block 650 can be the same pose information obtained in block 670. In some embodiments, the processor can also obtain coordinates (e.g., stored as metadata in an eyebuffer) indicating a location of the partial frames(s) within the full frame.

In block 680, the processor can combine and warp the full frame and any partial frames obtained in element 670. In some embodiments, warping can include inputting one or more of the full first frame, the partial frame(s), metadata including the coordinates indicating a location of the partial frames(s) within the full frame, the latest pose information (if different from the original pose information used to generate the rendering commands for and/or render the full frame or any partial frames), and/or the amount of time that passed from when any original pose data was determined. The reprojection algorithm can combine the full frame with the partial frame(s), using the coordinates to overwrite portions of the full frame that are also covered by the partial frame(s), and shift the rendered image to adjust for any pose changes (or estimated changes) that occurred after the original pose data was determined.

In some embodiments, the shift performed during the warp can be different for the areas covered by the partial frame(s) than the areas that correspond to the full frame. Because more time has passed from when the full frame was rendered, the areas that correspond to the full frame may be shifted or otherwise warped more than the areas covered by the partial frame.

In block 690, the processor can blend the combined frame and send the blended combined frame to system memory. In some embodiments, because different areas of the frame may be warped at different magnitudes, tearing artifacts can occur at or near the boundaries of the partial and full frames. Accordingly, warp correction and/or blending can be performed on the combined frame to remove or otherwise mitigate these artifacts. In various embodiments, the warp correction and/or blending may include alpha blending, circular blur or blending (e.g., away from the focal point), and/or feathering boundary regions by sampling both sides of the boundary. In some embodiments, the warp correction and/or blending may be content adaptive. For example, an element of content to be displayed across tiles can be identified, and the correction/blending can be performed to maintain the expected shape of the content. After the combined frame is blended, the combined, warped, and blended frame can be sent to system memory, and, from system memory, the combined, warped, and blended frame can be output to a display.

In block 695, the processor can determine whether to proceed with a partial frame or a full frame for the next frame to be displayed. For example, if the partial regions are rendered at one half of the full framerate, then following rendering a partial frame, the processor can proceed back to block 610 to render a full frame as the next frame (695, YES). As an additional example, if the partial regions are rendered at one third of the full frame rate, then following rendering a first partial frame, the processor can proceed back to block 650 to render a second partial frame (695, NO). In such a manner, different regions of a frame can be rendered at different framerates. As described above, the high framerate regions (updated each partial frame and each full frame) can correspond to region(s) with in the user's foveal vision, and the low frame rate regions (updated each full frame) can correspond to region(s) not in the user's foveal vision (e.g., in the user's peripheral vision).

Figure 7:
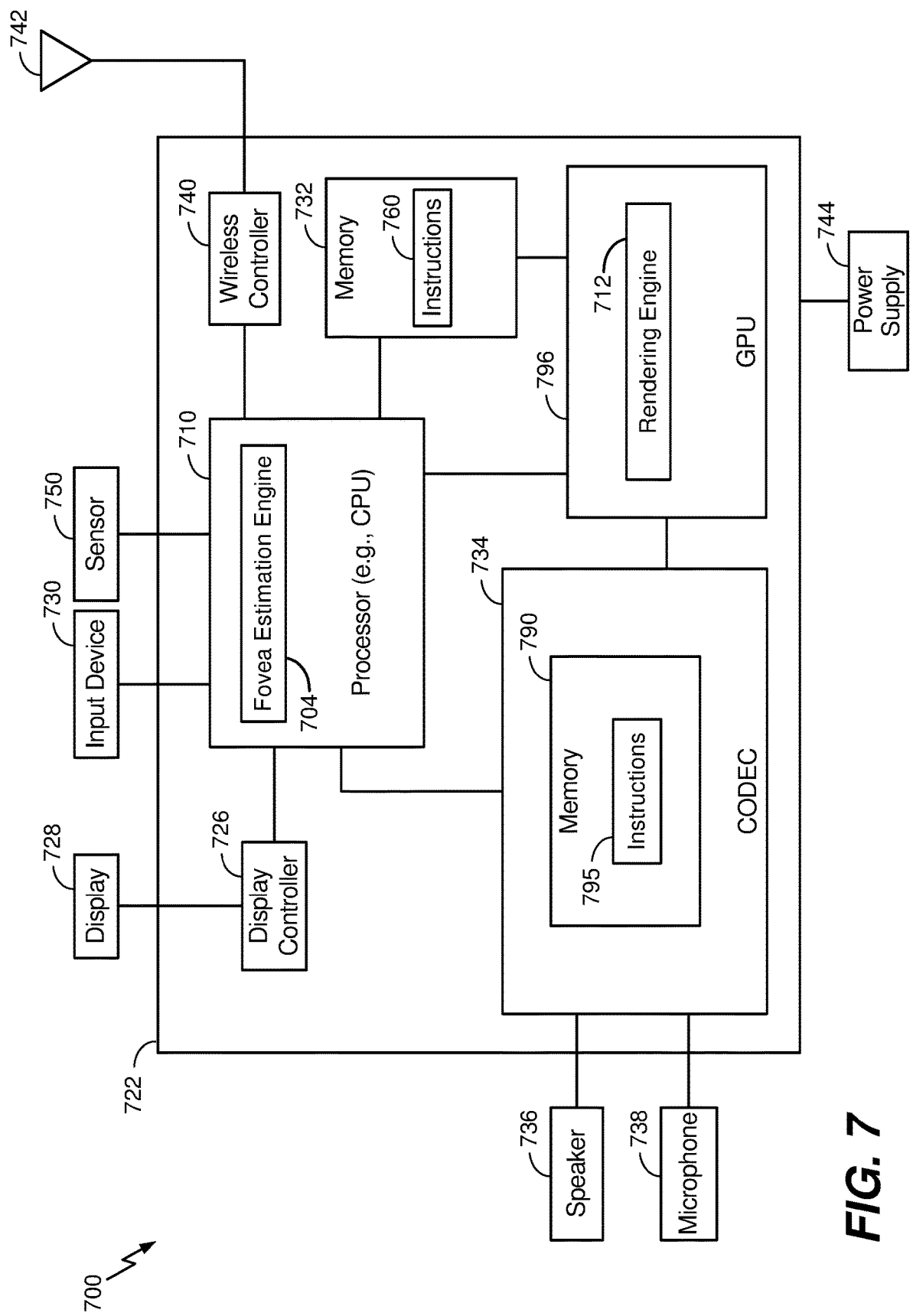
FIG. 7 is an example diagram of an electronic device that can perform foveated rendering, consistent with disclosed embodiments

Regarding to FIG. 7, an example diagram of an electronic device that can perform foveated rendering is depicted and generally designated as an electronic device 700. The electronic device 700 may correspond to a mobile device (e.g., a wireless communication device, such as a cellular handset), a computer (e.g., a server, a laptop computer, a tablet computer, or a desktop computer), an access point, a base station, a wearable electronic device (e.g., a personal camera, a head-mounted display, a VR headset, an AR headset, smart glasses, or a smartwatch), a vehicle control system or console (e.g., an advanced driver assistance system), an autonomous vehicle (e.g., a robotic car or a drone), a home appliance, a set top box, an entertainment device, a navigation device, a personal digital assistant (PDA), a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The electronic device 700 includes one or more processors, such as a processor 710 and a graphics processing unit (GPU) 796. The processor 710 may include a central processing unit (CPU), a digital signal processor (DSP), another processing device, or a combination thereof. In the example of FIG. 7, the processor may include the fovea estimation engine 704 and the GPU 796 may include the rendering engine 712. In other embodiments, the rendering engine 712 may be included in the processor 710 and/or the fovea estimation engine 704 may be included in the GPU 796, etc.

The processor 710 may be coupled to the GPU 796. In an illustrative example, the processor 710 may be configured to communicate with the GPU 796 using graphics application programming interface (API) calls. For example, the GPU 796 may include an API calls analyzer (not shown), and the processor 710 may be configured to provide the API calls to the API calls analyzer during graphics processing performed by the GPU 796.

The electronic device 700 may further include one or more memories, such as a memory 732. The memory 732 may be coupled to the processor 710, to the GPU 796, or to both. The memory 732 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another memory device, or a combination thereof.

The memory 732 may store instructions 760. The instructions 760 may be executable by the processor 710, by the GPU 796, or by both. In some embodiments, the instructions 760 may instruct the processor 710 and/or the GPU 796 to perform the processes described with regard to FIGS. 4-6.

A coder/decoder (CODEC) 734 can also be coupled to the processor 710. The CODEC 734 may be coupled to one or more microphones, such as a microphone 738. The CODEC 734 may also be coupled to one or more speakers, such as a speaker 736. The CODEC 734 may include a memory 790 storing instructions 795 executable by the CODEC 734.

FIG. 7 also shows a display controller 726 that is coupled to the processor 710 and to a display 728. In some embodiments, the electronic device 700 may further include a wireless controller 740 coupled to an antenna 742. In other embodiments, the electronic device 700 may further include a wired network controller (not shown) coupled to a computer network cable.

The electronic device 700 may further include a sensor 750 (e.g., a camera). The sensor 750 may be any type of sensor configured to capture images of a user's eye(s). The fovea estimation engine 704 may be configured to identify eye position information based on the captured images from the sensor 750.

In a particular example, the processor 710, the GPU 796, the memory 732, the display controller 726, the CODEC 734, and the wireless controller 740 are included in a system-on-chip (SoC) device. Further, an input device 730 and a power supply 744 may be coupled to the SoC device 722. Moreover, in a particular example, as illustrated in FIG. 7, the display 728, the input device 730, the speaker 736, the microphone 738, the antenna 742, the power supply 744, and the sensor 750 are external to the SoC device 722. However, each of the display 728, the input device 730, the speaker 736, the microphone 738, the antenna 742, the power supply 744, and the sensor 750 can be coupled to a component of the SoC device 722, such as to an interface or to a controller.

As used herein, "coupled" may include communicatively coupled, electrically coupled, magnetically coupled, physically coupled, optically coupled, and combinations thereof.

Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

The foregoing disclosed devices and functionalities may be designed and represented using computer files (e.g. computer files in file formats that include Graphic Database System II (GDSII), GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The integrated circuits are then employed in electronic devices, such as the electronic device 700 of FIG. 7.

Although certain examples have been described separately for convenience, it is noted that aspects of such examples may be suitably combined without departing from the scope of the disclosure. For example, the device 100, shown in FIG. 1, may be configured to operate based on aspects described with reference to each of FIGS. 2-7. Those of skill in the art will recognize other such modifications that are within the scope of the disclosure.

The various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

One or more operations of a method or algorithm described herein may be embodied directly in hardware, in a software module executed by a processor, or in a combination of the two. For example, one or more operations of the example process 600 of FIG. 6, and the like may be initiated, controlled, or performed by a field-programmable gate array (FPGA) device, an application-specific integrated circuit (ASIC), a processing unit such as a CPU, a digital signal processor (DSP), a controller, another hardware device, a firmware device, or a combination thereof. A software module may reside in RAM, MRAM, flash memory, ROM, EPROM, EEPROM, registers, hard disk, a removable disk, a CD-ROM, or any other form of non-transitory storage medium known in the art. An example storage medium is coupled to the processor such that the processor can read information from, and write information to, the storage medium. Additionally or in the alternative, the storage medium may be integral to the processor. The processor and the storage medium may reside in an ASIC. The ASIC may reside in a computing device or a user terminal. Additionally or in the alternative, the processor and the storage medium may reside as discrete components in a computing device or user terminal.

The previous description of the disclosed examples is provided to enable a person skilled in the art to make or use the disclosed examples. Various modifications to these examples will readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. A device for generating graphics content, comprising:
a memory; and
a processor coupled to the memory configured to cause the device to:
obtain a rendering command for a first frame of the graphics content;
render a full frame based on the rendering command for the first frame;
store the full frame in a buffer;
obtain a rendering command for a second frame of the graphics content;
obtain an eye position of a user;
render a partial frame based on the rendering command for the second frame and the eye position of the user;
obtain the full frame from the buffer;
combine the full frame and the partial frame using a warping algorithm to generate the second frame, wherein the full frame and the partial frame are warped based on pose data of the user, and wherein the full frame is warped differently than the partial frame; and
output the second frame.

2. The device of claim 1, the processor further configured to:
determine the pose data after rendering the full frame;
warp the full frame based on the pose data; and
output the first frame after the full frame is warped and prior to outputting the second frame.

3. The device of claim 1, the processor further configured to:
output the first frame, wherein the first frame comprises the full frame.

4. The device of claim 1, the processor further configured to:
store the partial frame in a second buffer that is different than the buffer; and
obtain the partial frame from the second buffer prior to outputting the second frame.

5. The device of claim 4, wherein storing the full frame in the buffer comprises replacing data in the buffer corresponding to a previous full frame; and wherein storing the partial frame in the second buffer comprises replacing data in the second buffer corresponding to a previous partial frame.

6. The device of claim 4, wherein the buffer is larger than the second buffer.

7. The device of claim 1, wherein the partial frame corresponds to a region in the graphics content that is determined based on the eye position of the user.

8. The device of claim 1, the processor further configured to:
combine the full frame and the partial frame using a blending algorithm to generate the second frame, wherein blending is performed at boundaries of the full frame and the partial frame.

9. The device of claim 1, the processor further configured to:
    store the partial frame in a second buffer;
    obtain a rendering command for a third frame of the graphics content;
    obtain a second eye position of the user;
    render a second partial frame based on the rendering command for the third frame and the second eye position of the user;
    obtain the full frame from the buffer;
    obtain the partial frame from the second buffer; and
    output the third frame, wherein the third frame is based on the full frame, the partial frame, and the second partial frame.

10. The device of claim 1, further comprising a display, wherein outputting the second frame comprises outputting to the display.

11. The device of claim 1, wherein the device is one or more of a wireless communication device, an augmented reality headset, or a virtual reality headset.

12. A method for generating graphics content comprising:
    obtaining a rendering command for a first frame of the graphics content;
    rendering a full frame based on the rendering command for the first frame;
    storing the full frame in a buffer;
    obtaining a rendering command for a second frame of the graphics content;
    obtaining an eye position of a user;
    rendering a partial frame based on the rendering command for the second frame and the eye position of the user;
    obtaining the full frame from the buffer;
    combining the full frame and the partial frame using a warping algorithm to generate the second frame, wherein the full frame and the partial frame are warped based on pose data of the user, and wherein the full frame is warped differently than the partial frame; and
    outputting the second frame.

13. The method of claim 12, further comprising:
    determining the pose data after rendering the full frame;
    warping the full frame based on the pose data; and
    outputting the first frame after the full frame is warped and prior to outputting the second frame.

14. The method of claim 12, further comprising:
    outputting the first frame, wherein the first frame comprises the full frame.

15. The method of claim 12, further comprising:
    storing the partial frame in a second buffer that is different than the buffer; and
    obtaining the partial frame from the second buffer prior to outputting the second frame.

16. The method of claim 15, wherein storing the full frame in the buffer comprises replacing data in the buffer corresponding to a previous full frame; and wherein storing the partial frame in the second buffer comprises replacing data in the second buffer corresponding to a previous partial frame.

17. The method of claim 15, wherein the buffer is larger than the second buffer.

18. The method of claim 12, wherein the partial frame corresponds to a region in the graphics content that is determined based on the eye position of the user.

19. The method of claim 12, further comprising:
    combining the full frame and the partial frame using a blending algorithm to generate the second frame, wherein blending is performed at boundaries of the full frame and the partial frame.

20. The method of claim 12, further comprising:
    storing the partial frame in a second buffer;
    obtaining a rendering command for a third frame of the graphics content;
    obtaining a second eye position of the user;
    rendering a second partial frame based on the rendering command for the third frame and the second eye position of the user;
    obtaining the full frame from the buffer;
    obtaining the partial frame from the second buffer; and
    outputting the third frame, wherein the third frame is based on the full frame, the partial frame, and the second partial frame.

21. A non-transitory computer-readable medium for generating graphics content, the non-transitory computer-readable medium storing a program containing instructions that, when executed by a processor of a device, cause the device to perform a method comprising:
    obtaining a rendering command for a first frame of the graphics content;
    rendering a full frame based on the rendering command for the first frame;
    storing the full frame in a buffer;
    obtaining a rendering command for a second frame of the graphics content;
    obtaining an eye position of a user;
    rendering a partial frame based on the rendering command for the second frame and the eye position of the user;
    obtaining the full frame from the buffer;
    combining the full frame and the partial frame using a warping algorithm to generate the second frame, and wherein the full frame and the partial frame are warped based on pose data of the user and the full frame is warped differently than the partial frame; and
    outputting the second frame.

* * * * *